United States Patent
Yang et al.

(10) Patent No.: US 11,028,895 B2
(45) Date of Patent: Jun. 8, 2021

(54) SHOCK ABSORBING AND IMPACT MITIGATING STRUCTURES BASED ON AXIAL-ROTATIONAL COUPLING MECHANISM

(71) Applicant: University of Washington, Seattle, WA (US)

(72) Inventors: Jinkyu Yang, Seattle, WA (US); Hiromi Yasuda, Seattle, WA (US)

(73) Assignee: University of Washington, Seattle, WA (US)

( * ) Notice: Subject to any disclaimer, the term of this patent is extended or adjusted under 35 U.S.C. 154(b) by 9 days.

(21) Appl. No.: 16/139,674

(22) Filed: Sep. 24, 2018

(65) Prior Publication Data

US 2019/0093728 A1 Mar. 28, 2019

Related U.S. Application Data

(60) Provisional application No. 62/562,596, filed on Sep. 25, 2017.

(51) Int. Cl.
*F16F 7/12* (2006.01)
*F16F 3/02* (2006.01)
(Continued)

(52) U.S. Cl.
CPC ............ *F16F 7/123* (2013.01); *F16F 1/025* (2013.01); *F16F 1/373* (2013.01); *F16F 3/02* (2013.01);
(Continued)

(58) Field of Classification Search
CPC .. F16F 7/123; F16F 7/003; F16F 1/025; F16F 1/373; F16F 3/02; F16F 3/0876
See application file for complete search history.

(56) References Cited

U.S. PATENT DOCUMENTS 2,936,145 A * 5/1960 Woelky ................... A47F 5/112
                                                           248/174
3,354,924 A * 11/1967 Birrell ..................... B65D 1/18
                                                           220/666
(Continued)

OTHER PUBLICATIONS

Guest, S.D., and S. Pellegrino, "The Folding of Triangulated Cylinders," Part I: Geometric Considerations, Journal of Applied Mechanics 61(4):773-777, Dec. 1994.
(Continued)

*Primary Examiner* — Vishal R Sahni
(74) *Attorney, Agent, or Firm* — Christensen O'Connor Johnson Kindness PLLC

(57) ABSTRACT

An impact mitigating assembly includes an elongate member formed from a plurality of triangulated cylindrical origami (TCO) unit cells that exhibit coupled rotational and axial motion. The unit cells include an end portion and a tubular member fixed to the end portion. The tubular member has a plurality of concave sides. Each side has a first triangular portion and a second triangular portion sharing an elastic connecting edge with the second triangular portion. The first triangular portion also shares an angled upright edge with the second triangular portion of an adjacent side. Compressing the tubular member longitudinally causes the connecting edge and the angled upright edge to elastically deform, for example by stretching, and causes the second end of the tubular member to rotate with respect to the first end of the tubular member.

18 Claims, 6 Drawing Sheets

(51) Int. Cl.
  *F16F 1/02* (2006.01)
  *F16F 3/087* (2006.01)
  *F16F 1/373* (2006.01)
  *F16F 7/00* (2006.01)
(52) U.S. Cl.
  CPC ............ *F16F 3/0876* (2013.01); *F16F 7/003* (2013.01); *F16F 7/12* (2013.01); *F16F 2224/0233* (2013.01)

(56) References Cited

U.S. PATENT DOCUMENTS

| | | | | |
|---|---|---|---|---|
| 4,028,701 | A * | 6/1977 | Parks | H01Q 15/20 342/8 |
| 4,115,975 | A * | 9/1978 | Bliss | A47C 4/286 248/166 |
| 5,163,262 | A * | 11/1992 | Adams | B64G 9/00 52/111 |
| 5,524,789 | A * | 6/1996 | Jackman | B65D 5/36 220/666 |
| 5,819,453 | A * | 10/1998 | Eichert | A47F 5/025 40/411 |
| 6,149,025 | A * | 11/2000 | Wang | B65D 37/00 220/6 |
| 6,397,528 | B1 * | 6/2002 | Rahimian | E04H 9/02 52/167.1 |
| 6,970,143 | B2 * | 11/2005 | Allen | H01Q 15/20 343/880 |
| 2007/0056969 | A1 * | 3/2007 | Wang | B65D 37/00 220/9.4 |
| 2015/0091362 | A1 * | 4/2015 | Kolich | B60N 2/64 297/452.42 |
| 2017/0113172 | A1 * | 4/2017 | Yoshida | B01D 53/04 |

OTHER PUBLICATIONS

Guest, S.D., and S. Pellegrino, "The Folding of Triangulated Cylinders," Part II: The Folding Process, Journal of Applied Mechanics 61(4):778-783, Dec. 1994.

Guest, S.D., and S. Pellegrino, "The Folding of Triangulated Cylinders," Part III: Experiments, Journal of Applied Mechanics 63(1):77-83, Mar. 1996.

Hagiwara, I., et al., "Optimization for Crush Characteristics of Cylindrical Origami Structure Using Reversed Spiral Model," Transactions of The Japan Society of Mechanical Engineers Series A 70(689):36-42, 2004.

Hunt, G.W., and I. Ario, "Twist Buckling and the Foldable Cylinder: An Exercise in Origami," International Journal of Non-Linear Mechanics 40(6):833-843, Jul. 2005.

Ishida, S., et al., "Design Concepts and Prototypes of Vibration Isolators Using Bi-Stable Foldable Structures," Proceedings of the ASME 2015 International Design Engineering Technical Conferences & Computers and Information in Engineering Conference (IDETC/CIE), Boston, Aug. 2-5, 2015, 7 pages.

Ishida, S., et al., "Vibration Isolators Using Nonlinear Spring Characteristics of Origami-Based Foldable Structures," Transactions of the Japan Society of Mechanical Engineers 80(820):1-11, 2014.

Jianguo, C., et al., "Bistable Behavior of the Cylindrical Origami Structure With Kresling Pattern," Journal of Mechanical Design 137(6), Jun. 2015, 8 pages.

Jianguo, C., et al., "Folding Behavior of a Foldable Prismatic Mast With Kresling Origami Pattern," Journal of Mechanisms and Robotics 8(3), Mar. 2016, 12 pages.

Kresling, B., "Plant Design: Mechanical Simulations of Growth Patterns and Bionics," Biometrics 3(3):105-122, 1995.

Lee, G.Y., et al., "Wave Mixing in Coupled Phononic Crystals via a Variable Stiffness Mechanism," Journal of the Mechanics and Physics of Solids 95:501-516, Oct. 2016.

Miura, K., "Proposition of Pseudo-Cylindrical Concave Polyhedral Shells," Proceedings of the IASS Symposium on Folded Plates and Prismatic Structures, Vienna, Sep.-Oct. 1970; pp. 141-163.

Yang, J., et al., "Formation of Rarefaction Waves and Reverse Shocks in Strain-Softening Lattices," Proceedings of the SIAM Conference on Applications of Dynamical Systems, Snowbird, Utah, May 21-25, 2017, 51 pages.

Yasuda, H., and J. Yang, "Origami-Based Mechanical Metamaterials for Tailoring Stress Wave Propagation," Proceedings of the Mach Conference, Annapolis, Maryland, Apr. 6, 2017, 29 pages.

Yasuda, H., and J. Yang, "Tunable Frequency Band Structure of Origami-Based Mechanical Metamaterials," Proceedings of the 2017 IASS Annual Symposium (Interfaces: architecture.engineering. science), Hamburg, Sep. 25-28, 2017.

Yasuda, H., et al., "Origami-Based Tunable Truss Structures for Non-Volatile Mechanical Memory Operation," Nature Communications 8(1):962, Oct. 2017.

Yasuda, H., et al., "Tunable Static and Dynamic Behavior of Triangulated Cylindrical Origami," Proceedings of the IASS Annual Symposia, International Association for Shell and Spatial Structures (IASS), vol. 2016, No. 13, pp. 1-10, 2016.

Zhao, X., et al., "Optimal Design for Crash Characteristics of Cylindrical Thin Walled Structure Using Origami Engineering," Transactions of the Japan Society of Mechanical Engineers Series A, 76(761):10-17, Jan. 2010.

Yasuda, H., et al., "Origami-Based Impact Mitigation via Rarefaction Solitary Wave Creation," arXiv:1805.05909, May 15, 2018, pp. 1-19.

* cited by examiner

SHOCK ABSORBING AND IMPACT MITIGATING STRUCTURES BASED ON AXIAL-ROTATIONAL COUPLING MECHANISM

CROSS-REFERENCE TO RELATED APPLICATION

This application claims the benefit of Provisional Application No. 62/562,596 filed Sep. 25, 2017; the entire disclosure of said application is hereby incorporated by reference herein.

STATEMENT OF GOVERNMENT LICENSE RIGHTS

This invention was made with government support under Grant No. 1553202, awarded by the National Science Foundation and Grant No. N00014-14-1-0388, awarded by the Office of Naval Research. The government has certain rights in the invention.

BACKGROUND

The principles underlying the art of origami paper folding can be applied to design sophisticated metamaterials with unique mechanical properties. A metamaterial is typically an assembly of elements configured to exhibit one or more properties that are typically not found in conventional materials. Mechanical metamaterials offer a new dimension in achieving nonconventional and tailored mechanical properties by design. The design of a metamaterial having novel wave propagation properties is disclosed below.

The manipulation of wave propagation is a topic of intense research for various engineering applications, e.g., waveguiding, vibration filtering, subwavelength imaging, and impact mitigation. The ability to achieve desirable mechanical performance often relies on the platform in which we construct mechanical metamaterials. Suitable platforms include one or more of periodically arranged micro-/macro-lattice structures, self-assembling particles, and 3D printed soft/hard architected materials.

Origami can serve as an ideal playground to realize highly versatile and tunable mechanical metamaterials. For example, by introducing crease lines into flat surface materials, one can construct origami-based structures that offer enhanced stiffness, negative Poisson's ratio, and multi-stability. Given the scale-free nature of origami, this design framework can be utilized in a wide range of scales. Origami has inspired a diverse set of design principles, including robotics, reconfigurable structures, and self-folding actuated by living cells.

However, the connection between the origami crease pattern and the dynamic folding/unfolding behavior of origami itself has been relatively unexplored. In particular, very few experimental studies have been reported. A unique wave dynamics in a mechanical metamaterial is disclosed herein that is composed of one or more volumetrically variable origami structures.

There is a need in a variety of applications for systems and components that provide protection to objects, sensitive equipment, buildings and other structures, and the like from incurring damage from external forces, such as impact forces, concussive or blast forces, and the like. For example, energy-absorbing structures that engage only during impact or blast events. In particular, such protective equipment would potentially reduce the risk of injury or death in vehicular accidents or attacks. Devices that reduce peak impact forces and/or delay such forces, would benefit in various applications, ranging from protecting sensitive equipment from unintentional external mishaps to protecting structures from ill-intentions attacks, including percussive attacks.

Device for mitigating impact to a protected object are disclosed that are derived from the study of origami, and may include a panel and a plurality of elongate members having a first end attached to the panel and a second end configured to engage the protected object. The elongate members each include a plurality of longitudinally connected unit cells. Each unit cell has an end member and a corresponding tubular member having an elastically variable axial length. A first end of the tubular member is fixed to the end member and a second end of the tubular member extends away from the end member. The tubular member has a plurality of sides each side including a first triangular portion and a second triangular portion. For each side, (i) the first triangular portion shares an elastic connecting edge with the second triangular portion, the connecting edge extending across the variable axial length of the tubular member; (ii) the first and second triangular portions are non-coplanar such that the side is concave; and (iii) the first triangular portion shares an elastic angled upright edge with the second triangular portion of an adjacent side, the angled upright edge extending across the variable axial length of the tubular member. Compressing the tubular member longitudinally causes the connecting edge and the angled upright edge to elastically deform and further causes the second end of the tubular member to rotate with respect to the first end of the tubular member.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An impact mitigating assembly includes a plurality of connected unit cells. The unit cells include an end member and a corresponding tubular member having a variable axial length. A first end of the tubular member is fixed to the end member and a second end of the tubular member extends away from the end member. The tubular member is formed to include a plurality of sides that each include a first triangular portion and a second triangular portion. For each side, (i) the first triangular portion shares a connecting edge with the second triangular portion, the connecting edge extending across the variable axial length of the tubular member; (ii) the first and second triangular portions are non-coplanar such that the side is concave; and (iii) the first triangular portion shares an angled upright edge with the second triangular portion of an adjacent side, the angled upright edge extending across the variable axial length of the tubular member. Compressing the tubular member longitudinally causes the connecting edge and the angled upright edge to elastically deform and further causes the second end of the tubular member to rotate with respect to the first end of the tubular member.

In an embodiment, the first triangular portions and the second triangular portions comprise triangular panels.

In an embodiment the first triangular portions each comprise a truss structure comprising three rods connected end-to-end to define the triangular portions.

In an embodiment the first and second triangular portions are obtuse, scalene triangular portions.

In an embodiment the plurality of sides comprise at least five sides.

In an embodiment the plurality of sides comprise six sides.

In an embodiment the plurality of unit cells comprise at least five unit cells.

In an embodiment the unit cells are identical.

In an embodiment the plurality of unit cells comprise at least one unit cell that is configured such that compressing the tubular member longitudinally causes the second end of the tubular member to rotate with respect to the first end of the tubular member in a first direction, and at least one unit cell that is configured such that compressing the tubular member longitudinally causes the second end of the tubular member to rotate with respect to the first end of the tubular member in a second direction that is opposite to the first direction.

In an embodiment at least some of the end members of the unit cells have a transverse length that is greater than a transverse length of the corresponding tubular member.

A device for mitigating impact to a protected object includes a panel and a plurality of elongate members having a first end attached to the panel and a second end configured to engage the protected object. The elongate members each include a plurality of longitudinally connected unit cells. Each unit cell has an end member and a corresponding tubular member having an elastically variable axial length. A first end of the tubular member is fixed to the end member and a second end of the tubular member extends away from the end member. The tubular member has a plurality of sides each side including a first triangular portion and a second triangular portion. For each side, (i) the first triangular portion shares an elastic connecting edge with the second triangular portion, the connecting edge extending across the variable axial length of the tubular member; (ii) the first and second triangular portions are non-coplanar such that the side is concave; and (iii) the first triangular portion shares an elastic angled upright edge with the second triangular portion of an adjacent side, the angled upright edge extending across the variable axial length of the tubular member. Compressing the tubular member longitudinally causes the connecting edge and the angled upright edge to elastically deform and further causes the second end of the tubular member to rotate with respect to the first end of the tubular member.

In an embodiment the first triangular portions and the second triangular portions comprise triangular panels.

In an embodiment the first triangular portions each comprise a truss structure comprising three rods connected end-to-end to define the triangular portions.

In an embodiment the first and second triangular portions are obtuse, scalene triangular portions.

In an embodiment the plurality of sides include at least five sides.

In an embodiment the plurality of sides include six sides.

In an embodiment the plurality of unit cells includes at least five unit cells.

In an embodiment the unit cells are identical.

In an embodiment at least one unit cell is configured such that compressing the tubular member longitudinally causes the second end of the tubular member to rotate with respect to the first end of the tubular member in a first direction, and at least one unit cell that is configured such that compressing the tubular member longitudinally causes the second end of the tubular member to rotate with respect to the first end of the tubular member in a second direction that is opposite to the first direction.

In an embodiment at least some of the end members have a transverse length that is greater than a transverse length of the corresponding tubular member.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

By exploiting the flat crease patterns that determine the dynamic folding and unfolding motion of origami, an origami-based metamaterial can be constructed that generates or forms rarefaction solitary waves in response to an applied impact force. Analytical, numerical, and experimental results based on the origami-based metamaterial demonstrate that this rarefaction solitary wave may overtake initial compressive strain waves generated by the applied impact force. Metamaterials designed in accordance with the present invention, and disposed between an impact force and a distal structure, will mitigate the resulting force experienced by the distal structure, and may in fact result in an initial tension at the structure rather than compression. This counter-intuitive dynamic mechanism can be used to create a highly efficient, and reusable, impact mitigating system without relying on material damping, plasticity, or fracture.

An impact mitigation structure is disclosed that is based on the use of volumetric origami structures, referred to as triangulated cylindrical origami (TCO) unit cells. When interpreting the disclosure herein, it will be understood that the disclosed TCO unit cells and assemblies of TCO unit cells 100 may be arbitrarily oriented, and reference to a particular orientation is for convenience and clarity; for example, terms such as "above", "below", "vertical", "top", "bottom", "upright", etc., should be interpreted in relation to the particular orientation of an embodiment, without limiting the embodiment to a particular orientation.

Figure 1A:
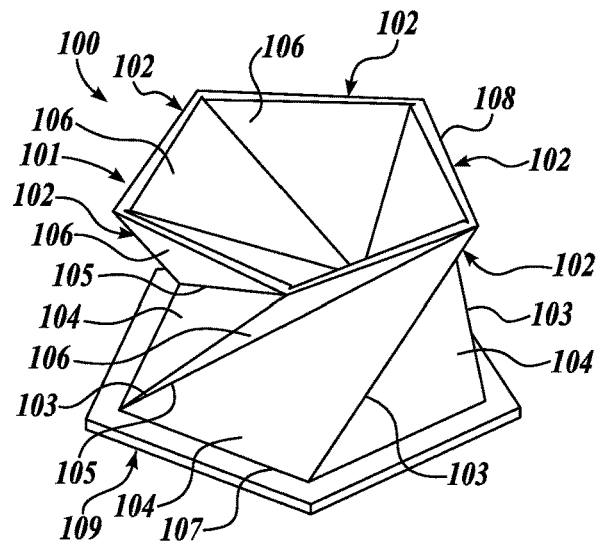
FIG. 1A is a perspective view of a first embodiment of a triangulated cylindrical origami (TCO) unit cell for an impact mitigating metamaterial in accordance with the present invention, wherein a tubular portion of the TCO unit cell has five sides.
Figure 1B:
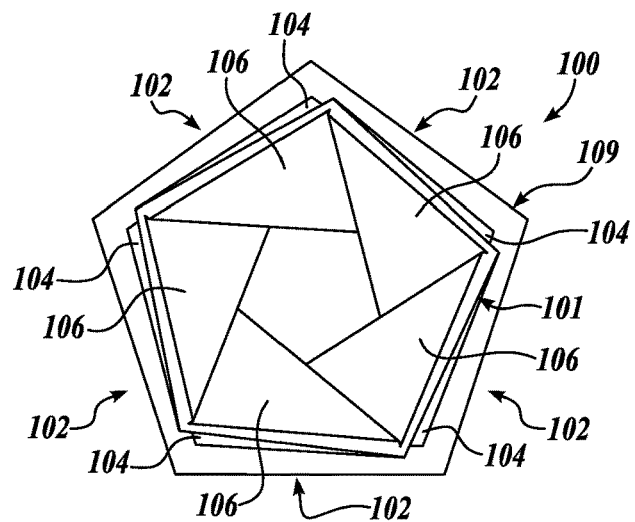
FIG. 1B is a plan view of the TCO unit cell shown in FIG. 1A.
Figure 1C:
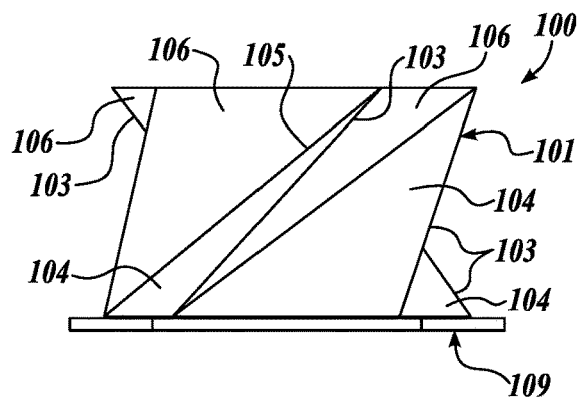
FIG. 1C is a front view of the TCO unit cell shown in FIG. 1A.

Particular embodiments of shock absorbing and impact mitigating structures in accordance with the present invention will now be described with reference to the FIGURES, wherein like numbers indicate like parts. A first embodiment of a TCO unit cell 100 is shown in FIGS. 1A-1C. FIG. 1A is a perspective view of the TCO unit cell 100, FIG. 1B is a plan view of the TCO unit cell 100, and FIG. 1C is a front view of the TCO unit cell 100. The TCO unit cell 100 includes a tubular portion 101 that is fixed to, and extends away from, a plate portion 109. In this embodiment the plate portion 109 has a transverse dimension that is greater than the transverse dimension of the tubular portion 101. In another embodiment the plate portion and tubular portion have identical or similar transverse dimensions. The tubular portion 101 is configured to be compressible as discussed in more detail below. For example, the tubular portion 101 may be formed from a conventional linear elastic material, a nonlinear elastic material, or a sacrificial non-elastic material. In other embodiments the tubular portion may include individual spring members to provide the desired elastic properties.

The tubular portion 101 has ten triangular portions, for example, triangular panels 104, 106. Other embodiments may include more or fewer triangular portions. The triangular panels are arranged in adjacent pairs. Each pair of triangular panels 104, 106 defines one of five outwardly concave sides 102. The outwardly concave sides 102 each include a first triangular panel 104 sharing or connected along a connecting edge 105 to a second triangular panel 106 in a non-planar orientation such that the panels 104, 106 form an outward angle less than 180 degrees. The first triangular panels 104 are fixed along a lower edge to the plate portion 109, and are connected to the second triangular panel 106 of an adjacent side 102 along an angled upright edge 103. The five connected sides 102 form the tubular portion 101. Although in the current embodiment the triangular panels 104, 106 have straight edges, in other embodiments the edges are curved, and "triangular panels" is herein defined to include panels with straight edges and panels with one or more curved edges.

The sides 102 are substantially identical, and the ten triangular panels 104, 106 are obtuse, scalene triangular panels. Each connecting edge 105 defines a vertex of the concave side 102, and are sometimes referred to as valley edges. The angled upright edges 103 that connect adjacent sides 102 produce a convex edge, and are therefore sometimes referred to as mountain edges.

Figure 4:
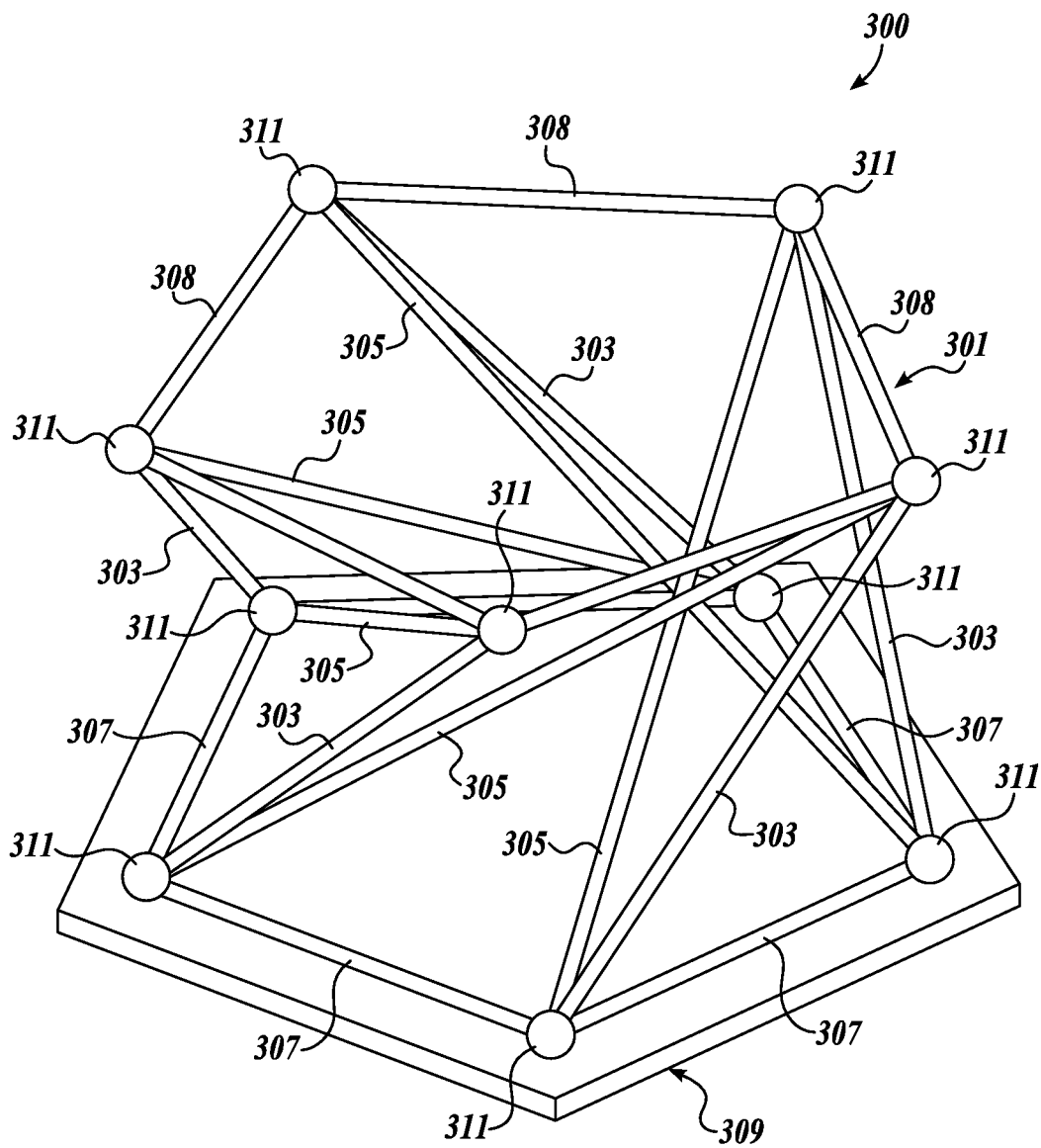
FIG. 4 is a perspective view of another embodiment of a TCO unit cell in accordance with the present invention, similar to the TCO unit cell shown in FIG. 1A, but wherein the triangular panels are replaced with rods.

Constructing a TCO unit cell 100 may be accomplished in any manner, as are well known in the art. For example, the tubular portion 101 may be formed as a unitary component using an additive manufacturing process, or the TCO unit cell 100 may be assembled from a plurality of triangular panels. Although in this embodiment the triangular panels 104, 106 are continuous, uniform, planar panels, in other embodiments the panels may be non-uniform and/or non-planar. For example, the triangular panels may have one or more apertures, or, as illustrated in FIG. 4, may be assembled triangular truss-type structures. The lower end 107 of the tubular portion 101 is pentagonal and is fixed to the plate portion 109. As discussed below with reference to FIG. 1D, the unit cells 100 may be stacked, with the upper end 108 of a lower tubular portion 101 connected to a lower side of the plate portion 109 of an upper unit cell 100, and with additional unit cells 100 serially connected to define an elongate structure.

The TCO unit cell 100 is configured to be elastically flexible at least in the longitudinal direction of the edges 103, 105. The edges 103, 105 are configured to have different spring constants, as discussed in Hiromi Yasuda et al., arXiv:1805.05909 (incorporated by reference below), which discloses at page 4, lines 7+"we use two different spring constants ($K_a$ and $K_b$) for the shorter . . . and longer crease lines . . . respectively. These two different spring constants ($K_a$ and $K_b$) are repeated on a single unit cell." The shorter crease line corresponds to edge 103 and the longer crease line corresponds to edge 105 in FIG. 1A, herein. The compressing, or "folding" motion of the TCO unit cell 100 is characterized by coupling between axial and rotational motions. In particular, compressing the tubular portion 101 of unit cell 100 in the longitudinal direction (vertically in FIG. 1A), for example, by applying an external axial force urging the second triangular panels 106 towards the first triangular panels 104, will produce a torque or twisting force urging the upper end 108 of the tubular portion 101 to rotate with respect to the lower end 107. Similarly, if a torque is applied to the upper end 108 of the tubular portion 101 with the lower end 107 fixed, rotation of the upper end 108 will cause the length of the tubular portion 101 to change. Therefore, the axial and rotational motions are clearly strongly coupled. The coupled axial and rotational motion of the unit cells 100 is sometimes referred to herein as the "folding/unfolding motion." Axially compressing the tubular portion 101 will cause the valley edges 105 and the mountain edges 103 to elastically deform, for example to stretch. The panels 104, 106 (and in particular the edges 103, 105) are preferably elastic, and will therefore, at least initially, elastically accommodate changes in the longitudinal length of the tubular portion 101, producing a restoring force. In some embodiments, for example sacrificial embodiments, the panels 104, 106 are not elastic, but deform plastically.

Figure 1D:
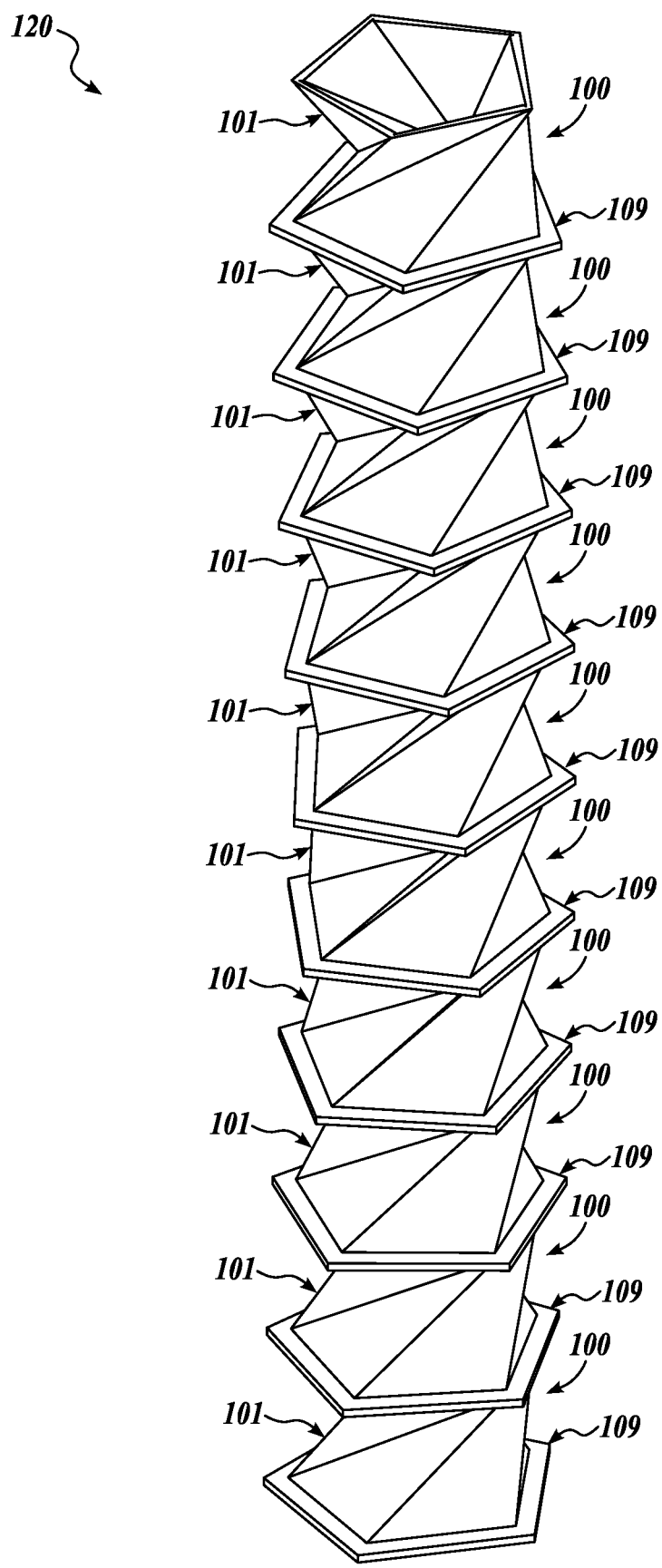
FIG. 1D illustrates an elongate structure formed from a longitudinal assembly of a plurality of the TCO unit cells shown in FIG. 1A.

An elongate assembly of a plurality of unit cells 100 is shown in FIG. 1D, wherein ten unit cells 100 are fixed in a linear one-dimensional assembly 120. A linear one-dimensional assembly of unit cells has been analyzed and experimentally tested, applying an axial force to one end of the assembly 120. The strongly coupled axial and rotational motion has been found to produce a novel wave behavior in response to applied axial forces. Although in this embodiment the ten unit cells 100 are similar, it will be appreciated by persons of skill in the art that in other embodiments the unit cells that form the elongate assembly may differ. For example, the unit cells may differ in height or lateral dimension, or may have differing number of sides (see, for example, FIG. 2A).

In particular, and as described in more detail in "Origami-based impact mitigation via rarefaction solitary wave creation," Hiromi Yasuda et al., arXiv:1805.05909, which is hereby incorporated by reference in its entirety, an elongate chain of twenty unit cells were assembled to investigate the wave dynamics of the chain of TCO unit cells. The left end of the chain was connected to a shaker with a sleeve bearing configured to transfer the shaker impact to the bottom unit cell. The TCO unit cell on the right end is fixed to a rigid wall. The reaction of the chain of TCO cells were photographed with six action cameras to obtain the dynamic folding/unfolding motion of each unit cell. When the force is applied, the first unit cell (adjacent the external force) initially exhibits a large-amplitude compression due to the excitation by the shaker. The compressive motion decays quickly without being robustly transmitted along the chain, but the tensile motion is evolved instead. Surprisingly, a tensile wave is propagated along the chain, despite the application of a compressive force to the chain.

Analyzing this counter-intuitive behavior, plotting the measured strains in time and space domains indicates that the applied compressive force produces two different types of mechanical waves: (i) a small-amplitude and fast-traveling oscillatory wave, and (ii) large-amplitude and slow-traveling, more localized waves. These two types of waves arise from the two degree of freedom nature of the TCO unit cells, coupling axial and rotational motion. While the first wave type is interesting, the second type of larger-amplitude waves are of particular interest to mitigating impact. In particular, it was found in this case that the primary wave that the last TCO unit cell (fixed to the rigid wall) experiences is a tensile wave, despite the application of a compressive impact to the first TCO unit cell.

A complementary analytical and theoretical analysis was conducted, wherein the equations of motion were formulated based on a two degree of freedom model of the TCO unit cell. The equations of motion were solved numerically to predict the dynamic behavior of the assembly. The simulation results were in very good agreement with the experimental results. In the theoretical analysis, we postulate a linear relationship between the axial and rotational motion based on the eigenmode of the single TCO unit cell. This allows the equations of motion to be reduced to a nonlinear single component model. We then take the continuum limit of the single component equations in the infinite TCO chain to derive the well-known KdV equation, which has a closed-form (rarefaction) solitary wave solution. To account for damping effects in the system, we adopt a dashpot damping factor in the equations of motion, which modifies the derived KdV equation. Using the KdV rarefaction wave as the initial function, a damping factor is determined by curve-fitting with the experimental data. This results in a reasonably close trend of the strain attenuation in the numerics compared to the experimental results. We observe the compressive component decays more drastically than the tensile counterpart. For example, the compressive waves show an order-of-magnitude reduction in amplitude within ten TCO cells. This manifests the efficacy of the origami-based metamaterial in mitigating the original compressive impact. The compressive waves are attenuated significantly, while the tensile waves are propagated more dominantly and robustly. A qualitative agreement was found between the analytical, numerical, and experimental results.

Figure 2A:
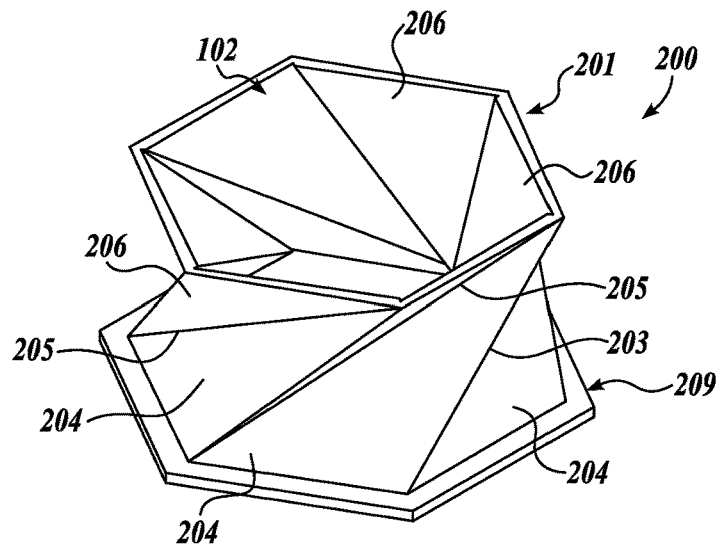
FIG. 2A is a perspective view of a second embodiment of a TCO unit cell for an impact mitigating metamaterial in accordance with the present invention, wherein a tubular portion of the TCO unit cell has six sides.
Figure 2B:
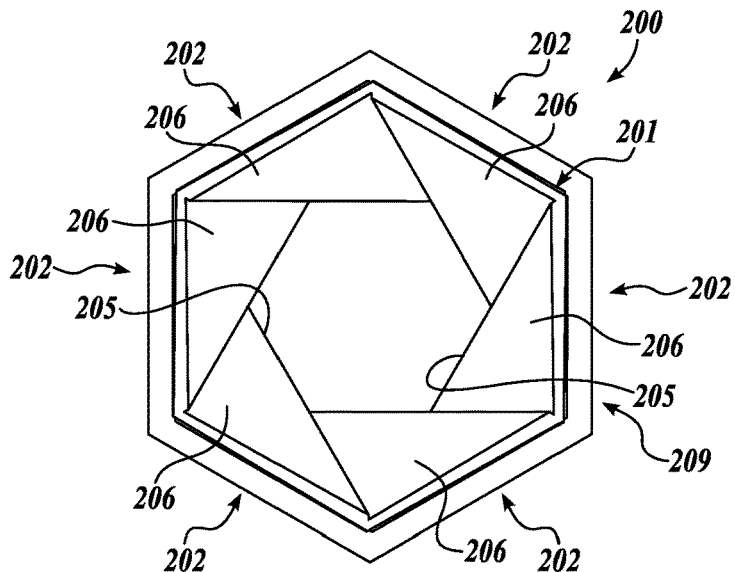
FIG. 2B is a plan view of the TCO unit cell shown in FIG. 2A.
Figure 2C:
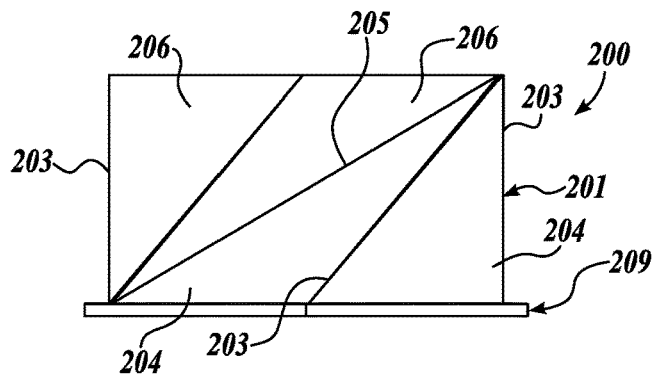
FIG. 2C is a front view of the TCO unit cell shown in FIG. 2A.

Another embodiment of a TCO unit cell 200 in accordance with the present invention is shown in FIGS. 2A-2C, illustrating a perspective view, a plan view, and a front view, respectively. In this embodiment the TCO unit cell 200 has a tubular portion 201 fixed to a plate portion 209. The tubular portion 201 is similar to the tubular portion 101 described above, except the tubular portion 201 has six sides 202. Each side 202 includes a first triangular panel 204 attached along a connecting edge 205 to a second triangular panel 206 that is not coplanar with the first triangular panel 204. The connecting edge 205 is a valley edge, similar to the connecting edges 105 discussed above. The first triangular panel 204 of each side 202 is connected to the second triangular panel 206 of an adjacent side 202 along an angled upright edge 203, which is a mountain edge, as defined above. The TCO unit cell 200 exhibits strongly coupled axial and rotational motion similar to the TCO unit cell 100, wherein axial compression of the tubular portion 201 will produce a rotational or twisting motion, and applying a torque to the tubular portion 201 will produce a change in its length. In other embodiments TCO unit cells may have more or fewer sides. Although in the current embodiment the triangular panels 204, 206 have straight edges, in other embodiments the edges are curved, as discussed above.

Figure 2D:
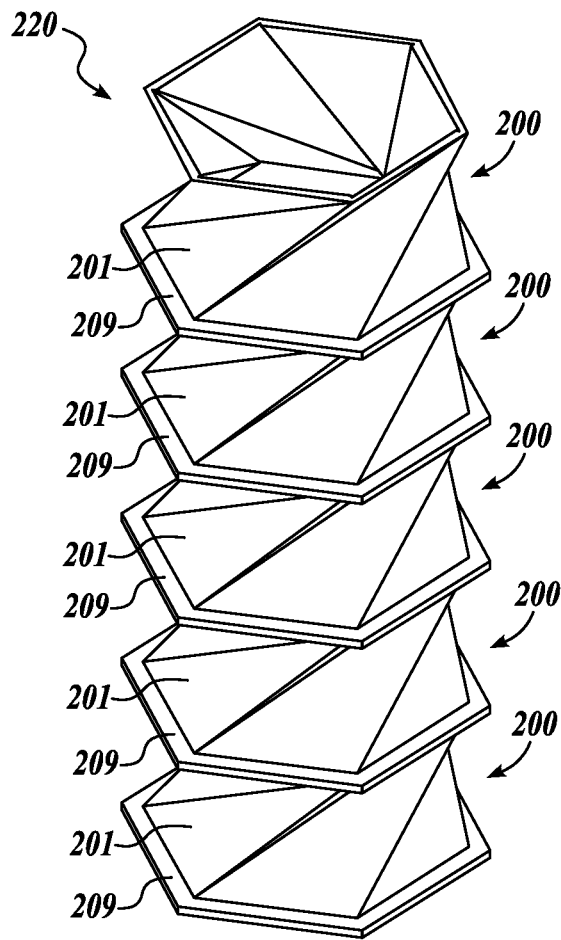
FIG. 2D illustrates an elongate structure formed by connecting in a stacked manner a plurality of the TCO unit cells shown in FIG. 2A.

FIG. 2D illustrates a linear one-dimensional assembly or elongate chain 220 comprising five unit cells 200 that are joined axially, with a top edge of the tubular portion 201 fixed to the plate portion 209 of the upwardly adjacent TCO unit cell 200, similar to the elongate assembly 120 shown in FIG. 1D. The assembly 220 produces similar dynamic wave behavior as described above, with coupled rotational and axial motion.

Figure 2E:
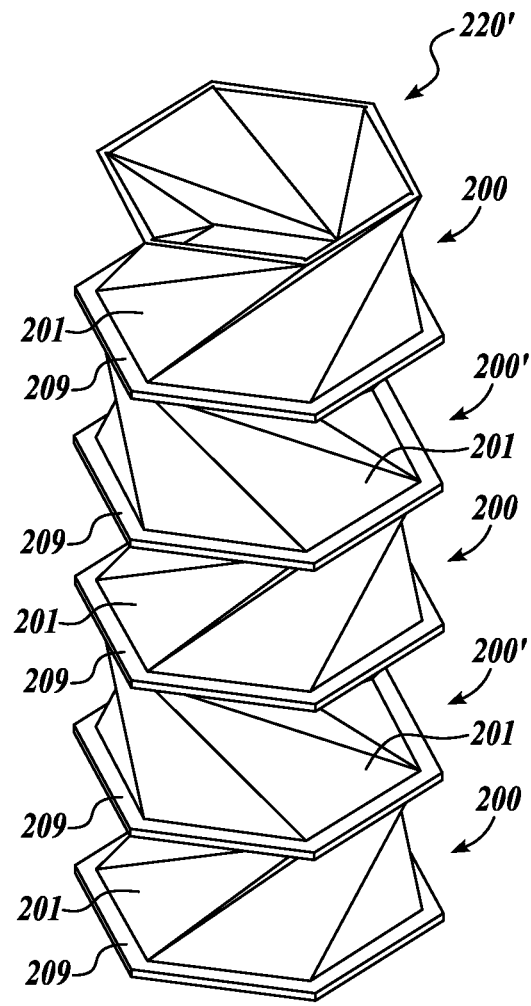
FIG. 2E illustrates an elongate structure similar to the structure shown in FIG. 2D, but wherein some of the TCO unit cells have a mirrored orientation.

FIG. 2E shows a modified linear one-dimensional assembly 220', wherein unit cells 200 are combined with mirror unit cells 200'. The mirror unit cells 200' are mirror-image to the unit cells 200. Therefore, an axial compression of the mirror unit cells 200' will cause a rotation in the direction opposite to the unit cells 200. In this embodiment the unit cells 200 alternate with the mirror unit cells 200'.

Figure 3:
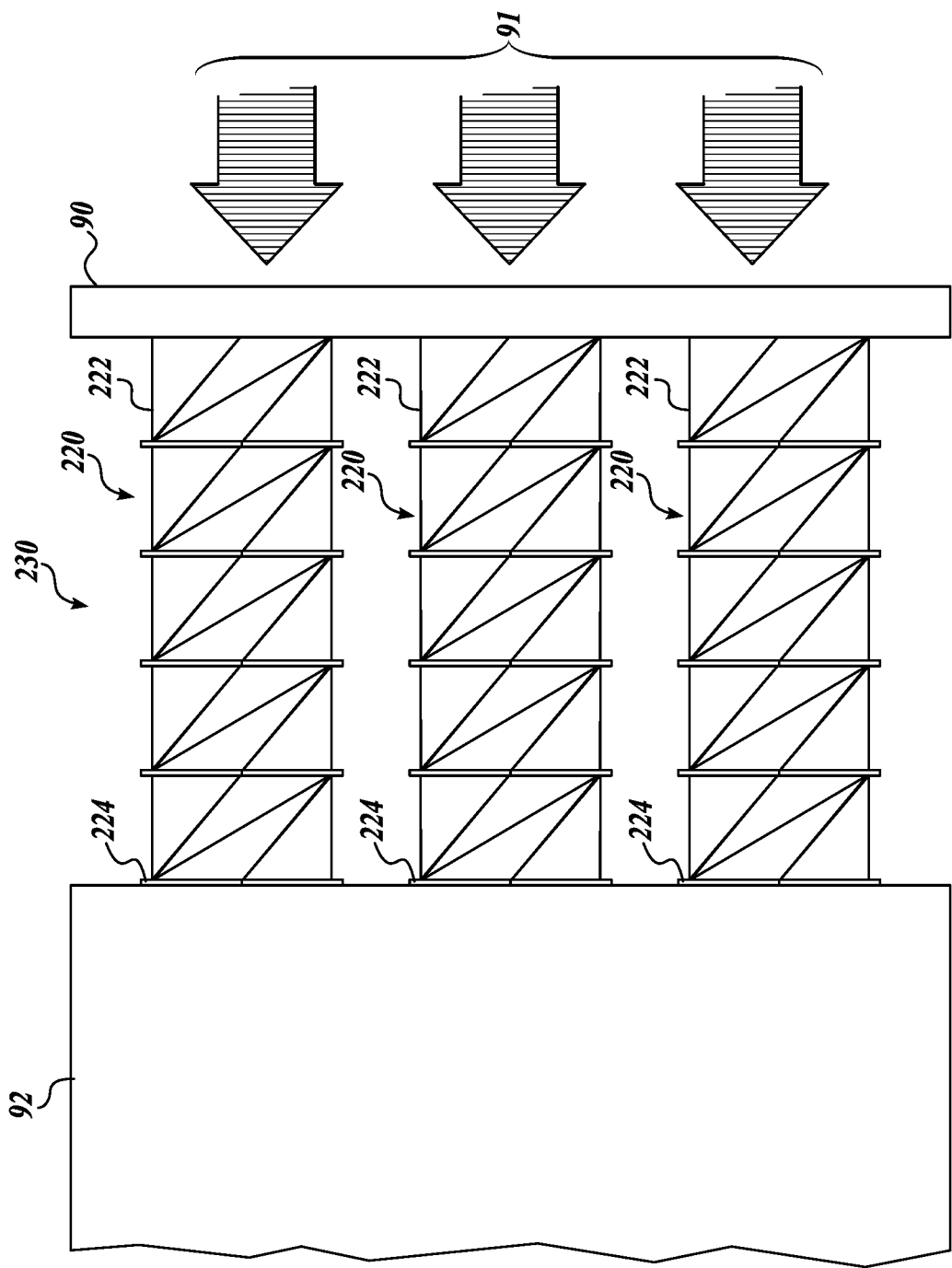
FIG. 3 illustrates an array of elongate structures shown in FIG. 2D and installed between a protected object and an external force, to provide impact mitigation for the object.

FIG. 3 illustrates an example of an impact mitigation assembly 230 formed with a plurality of the assemblies 220 shown in FIG. 2D, and arranged in a two-dimensional array (i.e., additional assemblies 220 may be aligned behind the assemblies 220 shown). A distal end 222 of each assembly 220 is fixed to a planar support 90 and a proximal end 224 of each assembly 220 is adjacent to a protected structure 92. The structure 92 may be, for example, a building, a sensitive mechanical or electrical component, a vehicle, or the like. An external force, for example, an impact force applied to the planar support 90, is represented by arrows 91. The impact force 91 may be of any type. For example, the impact force may a force resulting from dropping the device. In another example, the structure 92 may be a building or other stationary fixture, and the impact force may be from a moving object such as a vehicle impacting the planar support 90.

Another embodiment of a TCO unit cell 300 is illustrated in FIG. 4. The TCO unit cell 300 in this embodiment has a tubular portion 301 that is formed from a plurality of elongate members or rods 303, 305, 307, 308 joined at connecting ends 311 (represented for convenience as spheres). In a current embodiment the rods are elastic in the longitudinal direction. In other embodiments the rods deform plastically. In some embodiments the connecting ends are, for example, adhesive or welded joints, or connecting hardware. In other embodiments the unit cell may be formed as a single, unitary member. In particular, angled upright rods 303 correspond to the angled upright edges 103 in FIG. 1A, and the connecting rods 305 correspond to the connecting edges 105 shown in FIG. 1A. The upper rods 308 define the upper end of the tubular structure 301 and the lower rods 307 define the lower end of the tubular structure 301. Therefore, in this embodiment, first triangular elements (corresponding to triangular panels 104 in FIG. 1A) are triangular truss elements defined by a corresponding set of rods 303, 305, and 307. Second triangular elements (corresponding to the second triangular panels 106 in FIG. 1A) are triangular truss elements defined by a corresponding set of rods 303, 305, and 308.

The tubular portion 301 is fixed to a plate portion 309 similar to the plate portion 109 discussed above. The rod-based TCO unit cells 300 behave similarly to the panel-based unit cells 100, 200 described above, and may be used in the assemblies shown in FIGS. 1D, 2D, and 3.

Although the tubular portion 301 is illustrated with uniform rods of similar diameter for convenience, it is contemplated that the rods may be engineered to have different and/or varying diameter and/or cross-section shape. In other embodiments the rods may each be assemblies, for example, a spring-loaded telescoping rod or the like, to produce desired elastic properties.

We have studied experimentally, numerically, and analytically a remarkable example of nonlinear wave propagation in mechanical metamaterials made of volumetric TCO unit cells. The TCO-based metamaterials exhibit rarefaction solitary waves, which features tensile strains and propagates ahead of the initial compressive strain despite the application of a compressive impact. The initial compressive strain is attenuated significantly, which can be beneficial for impact mitigation applications. The findings in the one-dimensional embodiments can be extended to multi-dimensions in a modular way, for example as shown in FIG. 3, or with arrays of closely-backed one-dimensional elongate members 200. This architecture of volumetric origami cells can be used as a versatile building block for a wide range of applications including impact/shock mitigation, vibration filtering, and energy harvesting.

By exploiting the flat crease patterns that determine the dynamic folding and unfolding motion of origami, an origami-based metamaterial can be constructed that generates or forms rarefaction solitary waves in response to an applied impact force. Analytical, numerical, and experimental results based on the origami-based metamaterial demonstrate that this rarefaction solitary wave may overtake initial compressive strain waves generated by the applied impact force. Metamaterials designed in accordance with the present invention, and disposed between an impact force and a distal structure, will mitigate the resulting force experienced by the distal structure, and may in fact result in an initial tension at the structure rather than compression. This counter-intuitive dynamic mechanism can be used to create a highly efficient, and reusable, impact mitigating system without relying on material damping, plasticity, or fracture.

While illustrative embodiments have been illustrated and described, it will be appreciated that various changes can be made therein without departing from the spirit and scope of the invention.

The invention claimed is:

1. An impact mitigating assembly comprising:
a plurality of longitudinally connected unit cells comprising at least five unit cells;
each unit cell comprising:
an end member and a corresponding tubular member having a variable axial length, wherein a first end of the tubular member is fixed to the end member and a second end of the tubular member extends away from the end member, the tubular member comprising a plurality of sides each side comprising a first triangular portion and a second triangular portion, wherein for each side:
i) the first triangular portion shares a connecting edge with the second triangular portion, the connecting edge extending across the variable axial length of the tubular member, wherein the connecting edge is configured to have a first elastic spring constant;
ii) the first and second triangular portions are non-coplanar such that the side is concave;
iii) the first triangular portion shares an angled upright edge with the second triangular portion of an adjacent side, the angled upright edge extending across the variable axial length of the tubular member, wherein the angled upright edge is configured to have a second elastic spring constant that is different from the first elastic spring constant; and
wherein compressing the tubular member longitudinally causes the connecting edge and the angled upright edge to elastically deform and further causes the second end of the tubular member to rotate with respect to the first end of the tubular member.

2. The impact mitigating assembly of claim 1, wherein the first triangular portions and the second triangular portions comprise triangular panels.

3. The impact mitigating assembly of claim 1, wherein the first triangular portions each comprise a truss structure comprising three rods connected end-to-end to define the triangular portions.

4. The impact mitigating assembly of claim 1, wherein the first and second triangular portions are obtuse, scalene triangular portions.

5. The impact mitigating assembly of claim 1, wherein the plurality of sides comprise at least five sides.

6. The impact mitigating assembly of claim 1, wherein the plurality of sides comprise six sides.

7. The impact mitigating assembly of claim 1, wherein the plurality of unit cells are identical.

8. The impact mitigating assembly of claim 1, wherein the plurality of unit cells comprise at least one unit cell that is configured such that compressing the tubular member longitudinally causes the second end of the tubular member to rotate with respect to the first end of the tubular member in a first direction, and at least one unit cell that is configured such that compressing the tubular member longitudinally causes the second end of the tubular member to rotate with respect to the first end of the tubular member in a second direction that is opposite to the first direction.

9. The impact mitigating assembly of claim 1, wherein at least some of the end members of the unit cells have a transverse length that is greater than a transverse length of the corresponding tubular member.

10. A device for mitigating impact to a protected object, the device comprising:
a panel; and
a plurality of elongate members having a first end attached to the panel and a second end configured to engage the protected object,
wherein the elongate members comprise a plurality of at least five longitudinally connected unit cells;
each unit cell comprising:
an end member and a corresponding tubular member having an elastically variable axial length, wherein a first end of the tubular member is fixed to the end member and a second end of the tubular member extends away from the end member, the tubular member comprising a plurality of sides each side comprising a first triangular portion and a second triangular portion, wherein for each side:
i) the first triangular portion shares an elastic connecting edge with the second triangular portion, the connecting edge extending across the variable axial length of the tubular member, wherein the connecting edge is configured to have a first elastic spring constant;

ii) the first and second triangular portions are non-coplanar such that the side is concave;
iii) the first triangular portion shares an elastic angled upright edge with the second triangular portion of an adjacent side, the angled upright edge extending across the variable axial length of the tubular member, wherein the angled upright edge is configured to have a second elastic spring constant that is different from the first elastic spring constant; and wherein compressing the tubular member longitudinally causes the connecting edge and the angled upright edge to elastically deform and further causes the second end of the tubular member to rotate with respect to the first end of the tubular member.

11. The device of claim 10 wherein the first triangular portions and the second triangular portions comprise triangular panels.

12. The device of claim 10, wherein the first triangular portions each comprise a truss structure comprising three rods connected end-to-end to define the triangular portions.

13. The device of claim 10, wherein the first and second triangular portions are obtuse, scalene triangular portions.

14. The device of claim 10, wherein the plurality of sides comprise at least five sides.

15. The device of claim 10, wherein the plurality of sides comprise six sides.

16. The device of claim 10, wherein the plurality of unit cells are identical.

17. The device of claim 10, wherein the plurality of unit cells comprise at least one unit cell that is configured such that compressing the tubular member longitudinally causes the second end of the tubular member to rotate with respect to the first end of the tubular member in a first direction, and at least one unit cell that is configured such that compressing the tubular member longitudinally causes the second end of the tubular member to rotate with respect to the first end of the tubular member in a second direction that is opposite to the first direction.

18. The device of claim 10, wherein at least some of the end members have a transverse length that is greater than a transverse length of the corresponding tubular member.

* * * * *